Figure 1:
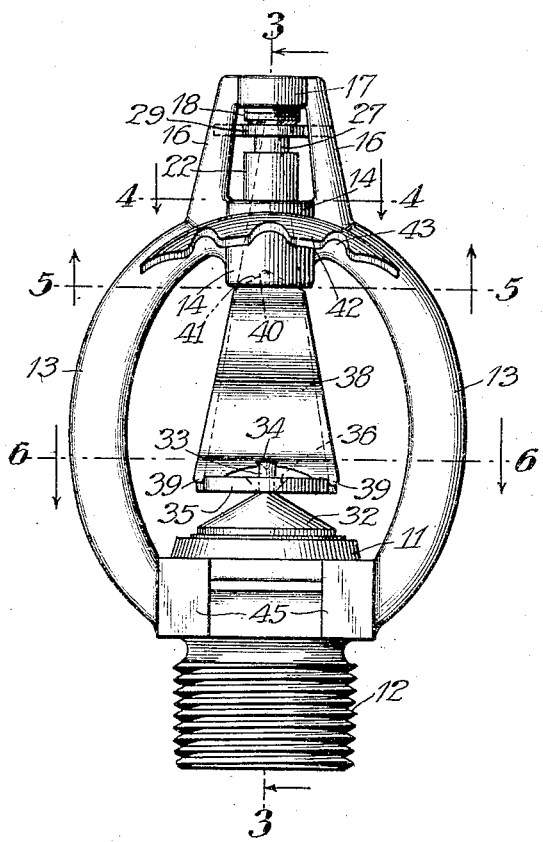

A. BLAUVELT.
SPRINKLER HEAD.
APPLICATION FILED JUNE 10, 1915.

1,236,901.

Patented Aug. 14, 1917.
2 SHEETS—SHEET 1.

Witnesses
Martin H. Olsen.
Robert D. Obberman.

Inventor
Albert Blauvelt
By Rector Hibben Davis Macauley
His Attys

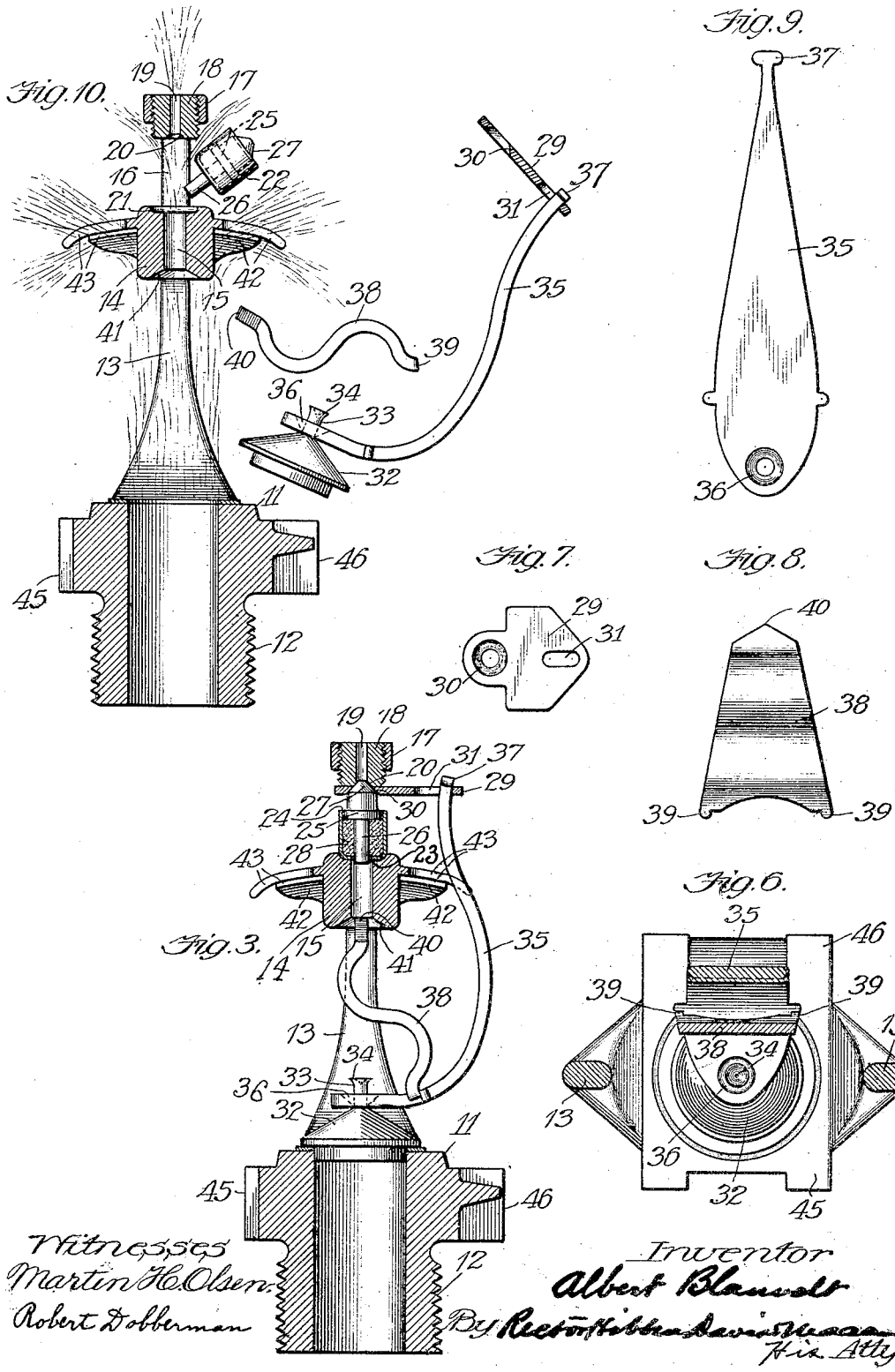

UNITED STATES PATENT OFFICE.

ALBERT BLAUVELT, OF CHICAGO, ILLINOIS.

SPRINKLER-HEAD.

1,236,901.   Specification of Letters Patent.   Patented Aug. 14, 1917.

Application filed June 10, 1915. Serial No. 33,346.

*To all whom it may concern:*

Be it known that I, ALBERT BLAUVELT, a citizen of the United States, residing at Chicago, in the county of Cook and State of Illinois, have invented certain new and useful Improvements in Sprinkler-Heads, of which the following is a specification.

My invention relates more particularly to that class of automatic sprinklers designed for the extinction of fire, in which a valve controlling an outlet from a water pipe of a pressure system is normally held to its seat by a brace or bridge of mechanical elements which are maintained in tensed normal position by fusible metal, the construction being such that when the heat of the surrounding atmosphere makes such metal very soft or fluid, the brace or bridge gives way, the valve leaves its seat and a stream of water is released.

In sprinkler heads as now commonly employed in the bridge or brace for maintaining the valve closed, the fusible metal takes the form of a soldered connection the rupture of which permits the bridge or brace to fly apart and thereafter leave the valve free to move as acted on by the pressure in the pipe system. To compel said brace or bridge to fly apart it is customary to stress the same far more than is in any way necessary to merely maintain the valve closed.

Sprinkler heads are apt to become incrusted or clogged over with dirt, flyings, corrosion, drippings, etc., in the various situations where they are commonly used, resulting in a tendency of the parts to adhere together. On this account it is desirable to employ a permanent high elastic stress greater than now commonly used in order to make the release or snap action more positive.

There are many objections to depending on a soldered joint to restrain such stored motive power or snap action of which it may be mentioned that such a joint, when of permissible dimensions, has rather a low tensile strength, so much so as to require the use of fusible metal less sensitive to heat than is desirable for use for swift fires such as happen, for example, in connection with the storage of cotton. Furthermore, such soldered joints are capable of variation in internal assemblement, in soldering flux, adhesion, segregation of components of the solder, or reduction of cemented area by air bubbles and by reason of variations in the temperature employed in soldering and time of application of heat and rate of cooling, so that the device is not absolutely dependable despite the many difficult and expensive precautions of manufacture now resorted to. Evidence of this unreliability of soldered joints is found in the commercial practice of carrying insurance against water damage due to the bursting of sprinkler heads, whether made with the more or the less fusible solders.

In my improved construction, while the snap action of the sprinkler is released as before by the softening or fusion of a fusible metal, it is independent of the tensile or adhesive strength thereof. Other features of improvement and advantage will appear from the detailed description hereinafter given.

In the accompanying drawings, I have shown a preferred form of the invention but it is to be understood that the specific disclosure is for the purpose of exemplification only, and that the scope and nature of my invention is indicated in the following claims in which I have endeavored to distinguish it from the prior art so far as known to me without relinquishing or abandoning any feature thereof.

Figure 2:
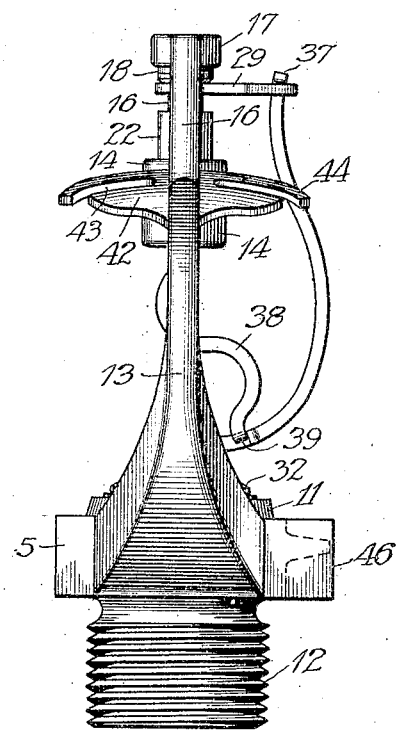
Figure 4:
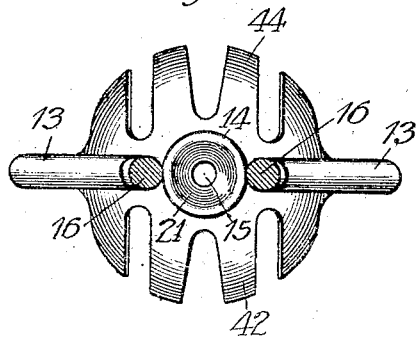
Figure 5:
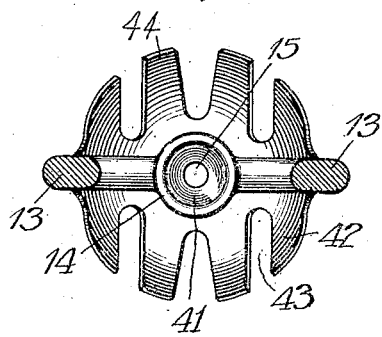

Referring now to the accompanying drawings, Figure 1 is a side elevation of a sprinkler head embodying my invention; Fig. 2 a similar view at right angles to the plane of Fig. 1; Fig. 3 a central section, partly in elevation, upon the plane of the line 3—3 of Fig. 1 parallel to that of Fig. 2; Fig. 4 a section upon the line 4—4 of Fig. 1; Fig. 5 a section upon the plane of the line 5—5 of Fig. 1 looking upward in the direction of the arrow; Fig. 6 a horizontal section upon the plane of the line 6—6 of Fig. 1; Figs. 7, 8, and 9 elevations of details to be presently described and Fig. 10 a section corresponding to Fig. 3 showing the parts, however, as they appear just after the valve has been released.

The sprinkler head comprises a nozzle 11 provided as usual with a screw nipple 12 for coupling it to the pipe system and a yoke 13 preferably cast integral with the nipple and extending above the same. Above and in axial alinement with the nozzle the yoke is formed with a cylindrical enlargement or boss 14 which is preferably axially perforated at 15 for a purpose which will appear. Lugs 16—16 extend above said boss and are connected at their upper ends by an internally threaded annulus 17. This annulus receives a threaded adjustable plug 18 which is centrally perforated at 19 and formed with a conical seat 20 in its lower end for a purpose which will appear. The upper end of the cylindrical boss 14 is countersunk at 21 to form a seat for a sheet metal capsule or cartridge 22 the lower end of which is closed except for a central aperture 23 and the upper end open as at 24. A plunger or follower 25 loosely fits within the capsule and has a downwardly projecting stem 26, the lower end of which is received and guided within the opening 23. The upper face of the plunger is formed or provided with a conical boss or projection 27, the end of which fits within the seat 20 on screw plug 18 referred to above. When the sprinkler head is in use the capsule is substantially filled with granulated fusible metal 28 upon which the plunger rests and which maintains said plunger in its uppermost position, with the tip thereof in seat 20. A latch-link 29, formed at one end with a conical or countersunk hole 30, fits over the conical boss 27 and is held between the same and the screw plug, and the other end of said latch-link is provided as at 31 with an elongated perforation for a purpose which will appear.

The valve 32 which closes the nozzle is formed with an upwardly projecting stem 33 and head 34, and a spring lever 35 is perforated and countersunk at 36 to receive said stem, the head upon the latter being upset or swaged thereon after the stem has been inserted through the opening 36. The other end of the spring lever 35 is reduced and formed with a cross head 37 and is inserted in the opening 31 in the latch plate in an obvious manner. A strut or brace plate 38 of spring metal bent, as shown, to provide greater resilience, is formed at its lower end with lugs 39 which embrace the spring lever 35 and at its upper end is beveled as at 40 and received in the conical seat 41 of the boss 14. When the parts are assembled, as shown in Fig. 3, the spring lever 35, the upper end of which is held by link 29, is put under stress so that it somewhat compresses the spring strut 38 and also bears with considerable force upon the valve to maintain the latter closed. The yoke is formed upon opposite sides with deflecting wings 42—42 which are slotted, as at 43, substantially perpendicularly to the plane of the yoke 13 and the fingers or prongs 44 are bent downwardly to better distribute the water striking the same.

The nozzle is further formed with a wrench head 45 for convenience in screwing the same into the coupling of the sprinkler system and it is to be noted (see Fig. 6) that the construction of this portion of the device is not symmetrical but the lugs 46 on the side where the spring lever is held are extended laterally well beyond the plane of the latter in order to avoid the likelihood of breaking or displacing it or injuring the connections in case the wrench should slip in applying the sprinkler head to the pipe system.

The sprinkler head is preferably assembled before application to the system as follows: The capsule is first filled with granulated fusible metal packed closely nearly to the top thereof, and the plunger is then placed in position with its stem extending through the perforation in the bottom of the capsule. The fit or play of the plunger and its stem in the capsule may vary to suit various fusible metals but is always close enough to securely hold at or below normal temperatures the fusible metal when under a stress per unit area far exceeding that which could be borne by the same fusible metal if used in a solder joint. These parts are preferably sealed as for example by a slight film of wax to protect the granulated fusible metal from corrosion. While in its broader aspect my invention is not confined to granulated metal I prefer to use the latter because of ease of manipulation, and further, because fusible metals, not being true alloys, are apt to be unhomogeneous and by granulating the alloy after it has been made I secure greater uniformity by thoroughly mixing the particles thereof. To accomplish such mixing I find it best to granulate the fusible metal and mix it cold, thus avoiding risk of alteration by oxidation or segregation or flux effects such as occur if the metal be re-melted as for the production of a soldered joint.

It is obvious that the assembly just described, comprising the capsule, fusible metal, and plunger, establishes a telescopic strut, when in position between the cylindrical boss and screw plug. The latch link is connected to the spring lever in an obvious manner, the valve placed in position and the spring strut interposed between said lever and the boss on the frame. The lever is then bent by an assembly fixture in order to bring the conical hole 30 in the link concentric with the seat in the lower face of the screw plug 18, and the screw plug is then driven downward until it grips the latch-link between it and the conical top end of the telescopic strut. The cylindrical boss upon the frame and the screw plug thus form abutments between which the link-plate and the telescopic strut are clamped. The fusible metal furnishes, when cold, a very high resistance to any shortening of the telescopic strut, thereby firmly holding the latch-link, notwithstanding that the greatest possible permanent tension is exerted by the spring lever. The conical form of the hole in the latch-link under the lateral stress of the spring lever causes the plunger of the telescopic strut to exert a constant pressure upon the fusible metal, but the plunger being properly guided at the lower end and entering the screw plug at the top of the projection 27 and the pressure of the plunger therefore being evenly distributed, said pressure is readily resisted by the metal when cold. The fusible metal is under so considerable a pressure that under rise of temperature it moves so soon as it reaches what is known as the pasty or plastic state, which in point of time is well in advance of the fused or fluid state, thereby securing a more prompt action at time of fire.

Because of the loose fit of the plunger and its lower stem in the capsule the pasty, nearly fused or fused metal quickly flows around the edges of the former under the high pressure exerted upon it. The telescopic strut thus shortens sufficiently to release the latch-link which, under the stress of the spring lever, is drawn endwise from engagement with the telescopic strut and abutment plug, releasing said lever, which, under the impulse of its action, added to by the action of spring strut 38, jerks the valve from its seat, thus opening the nozzle. The telescopic strut complete is dislodged by the movement of the link, as shown in Fig. 10, thus leaving only the integral parts of the frame or yoke including the deflector or distributing plate and the screw plug in position. Part of the water is deflected by said plate and sufficient quantities pass through the slots therein and a small stream spurts upward through the axial openings in the boss and plug so that any area immediately above the sprinkler head is thoroughly wetted.

I prefer a sprinkler having a long range of elastic action and to forcibly remove the valve, as illustrated by my Patent No. 920,252, granted to me May 4, 1909.

As heretofore pointed out, my improved sprinkler head is adapted to use any practicable spring stress as the security of the head against operating when it should not, is independent of the relatively low tensile strength of the fusible metal, and is reliable because of the relatively high resistance of the latter to crushing strains when confined as shown. My device is cheap to manufacture as it lends itself to automatic machine manufacture throughout. It dispenses with the relatively costly operation of soldering and the uncertainties of action or undesired action resulting therefrom, and it enables the use in needed fields for "fusible metal release action" of metals fusible at temperatures lower than are practicable when used as solder.

I claim:

1. In a sprinkler head of the class described, a nozzle, a valve normally closing said nozzle, means for normally maintaining said valve closed, comprising a body of granulated fusible material under pressure.

2. In a sprinkler head of the class described, a nozzle, a valve normally closing said nozzle, means for holding said valve closed comprising a container, granulated fusible material in said container and a follower in said container bearing upon said material.

3. In a sprinkler of the class described, a nozzle, a valve normally closing the same, a frame, abutments on the frame, stressed means for maintaining the valve in closed position, a telescopic strut engaging said abutments and maintaining said means under stress, said strut comprising a pair of elements movable toward each other, and a body of fusible material under pressure for maintaining said elements in fixed relation.

4. In a sprinkler head of the class described, a nozzle, a valve normally closing said nozzle, a frame connected to said nozzle, an abutment on said frame, means for normally maintaining said valve closed comprising an element adapted to engage said abutment, and means for maintaining said element in engagement with said abutment comprising a body of fusible material and a pair of members under pressure urging them toward each other and held in fixed relation against said pressure by said fusible material.

5. In an automatic sprinkler of the class described, a nozzle, a valve closing the nozzle, a frame, means for maintaining the valve in closed position comprising a body of granulated fusible material under pressure.

6. A sprinkler comprising a nozzle, a valve normally closing said nozzle, a frame connected to said nozzle, an abutment on the frame, means for maintaining the valve closed, a link engaging said means and said abutment, and means comprising a body of fusible material and a pair of members under pressure urging them toward each other and held in fixed relation against said pressure by said fusible material maintaining said link in engagement with said abutment.

7. In a sprinkler of the class described, a nozzle, a valve normally closing said nozzle, a frame, a pair of abutments on the frame, a lever for maintaining the valve closed, a link connected to said lever and engaging one of said abutments, and means for maintaining said link in said engagement comprising a cup, a plunger and a body of fusible material within the cup.

8. In a sprinkler of the class described, a nozzle, a valve closing the nozzle, a frame extending above the nozzle, a pair of abutments arranged above the nozzle on said frame, mechanical elements for maintaining the valve closed under spring pressure, a latch-link maintaining said elements under stress, a strut engaging said abutments and engaged by and maintaining said latch-link against the stress of the mechanical elements, said strut comprising a body of fusible metal of substantial thickness under pressure.

9. In a sprinkler head, a nozzle, a valve, a frame, a pair of abutments on the frame, one of which is adjustable toward and from the other abutment, mechanical elements for maintaining the valve closed, a telescopic strut controlling said elements and extending between the abutments, and comprising a body of fusible material maintaining the ends of the strut in engagement with both of said abutments.

10. In a sprinkler of the class described, a nozzle, a valve normally closing said nozzle, mechanical elements for maintaining said valve closed, a pair of abutments, one of which is adjustable toward and from the other, and a strut extending between said abutments comprising a body of fusible metal put under pressure by adjustment of the adjustable abutment and a connection between said strut and said mechanical elements for normally maintaining the latter in position.

11. In a sprinkler of the class described, a nozzle, a valve normally closing said nozzle, mechanical elements normally under stress and maintaining said valve closed, means for maintaining said mechanical elements in normal position comprising a pair of abutments, a capsule, fusible material in said capsule, a follower supported on the fusible material in said capsule, and a link engaged by said follower for maintaining said elements in operative position.

12. In an automatic sprinkler, a nozzle, a valve normally closing said nozzle, a frame connected to said nozzle, a boss carried by said frame, a capsule seated on said boss, a fusible body in said capsule, a follower in said capsule supported by said fusible body, an abutment and a latch engaged between said abutment and follower and maintaining said elements in operative position.

13. In a sprinkler of the class described, a nozzle, a valve normally closing said nozzle, mechanical elements maintaining said valve closed, a telescopic strut having a tapered surface, a latch engaging said tapered surface and maintaining the elements in operative position, and a body of fusible material under pressure maintaining said strut in operative relation with said abutment.

14. In a sprinkler head, a nozzle, a valve, a frame connected to said nozzle, a boss on said frame, a plug mounted in said frame and spaced from and adjustable toward and from said boss, mechanical elements normally maintaining said valve closed, a perforated latch engaging said plug and connected to said mechanical elements for maintaining them in operative relation, a capsule seated on said boss, a body of fusible material in said capsule, a plunger on said fusible material engaging a hole in said latch and maintaining it in engagement with said plug.

15. In a sprinkler, a nozzle, a valve normally closing said nozzle, a frame connected to the nozzle, a boss on the frame, an abutment adjacent but spaced from said boss, a lever one end of which engages said valve and maintains the same closed, the other end of which extends adjacent said boss and abutment, a latch connected to said lever and movable toward and from said abutment, a capsule seated on the first said boss, a plunger and fusible material within said capsule, said plunger engaging the latch and normally maintaining it against lateral movement.

16. In an automatic sprinkler, a nozzle, a valve, a yoke connected to the nozzle and extending above the valve, a perforated boss on said frame substantially coaxial with said nozzle, a perforated abutment on said frame coaxial with said nozzle and boss, mechanical elements for maintaining said valve closed, a latch plate connected thereto and laterally movable, a capsule and plunger arranged between said boss and abutment and engaging said boss and latch respectively, and fusible material within the capsule maintaining the capsule and plunger in normal relation.

17. In a sprinkler, a nozzle, a valve, a yoke connected to the nozzle and formed with a boss and an annulus in actual alinement with said nozzle, a plug axially adjustable in said annulus, mechanical elements for maintaining the valve closed, a latch connected to said mechanical elements, a capsule seated on the boss, a plunger in said capsule engaging the latch and the adjustable plug, and fusible material in the capsule maintaining the normal relation of said capsule and said plunger.

18. An automatic sprinkler comprising a nozzle, a valve, mechanical elements for normally maintaining the valve closed, an abutment having a recess therein, a link loosely connected to one of said mechanical elements and having a conical hole therein, a telescopic strut including a body of fusible material extending into said hole and adapted to maintain said link in engagement with said abutment.

19. In a sprinkler of the class described, a nozzle, a valve, a frame, a spring lever engaging said valve at one end and having a cross head at the other, a spring strut interposed between said frame and said lever, an abutment, a latch plate engaging the abutment and having a slot to receive the end of said lever and a countersunk hole, a telescopic strut engaging said hole, interposed between said latch plate and the first said boss and comprising a body of fusible material adapted to maintain the strut in engagement with the latch plate.

20. In an automatic sprinkler, a nozzle, a valve, mechanical elements for maintaining the valve closed, means for maintaining said mechanical elements in operative position, comprising a capsule, a plunger in the capsule, a body of fusible metal between the plunger and the capsule, the body of fusible metal being sealed in said capsule.

21. In an automatic sprinkler, a nozzle, a valve, mechanical elements for maintaining the valve closed, means for maintaining said mechanical elements in operative position comprising a capsule, a plunger in the capsule, and a body of granulated fusible metal between the plunger and the capsule.

22. An automatic sprinkler comprising a nozzle, a valve for closing the nozzle, a yoke integral with said nozzle, and extending above the same, a pair of abutments in substantially axial alinement with the nozzle, spring means for maintaining the valve closed, a collapsible strut sensitive to heat extending between said abutments, and a latch-link connected to said spring means and maintained in position by said collapsible strut.

ALBERT BLAUVELT.

Witnesses:
LESLIE D. WOOD,
GEO. L. W. GOODWILLIE.

Copies of this patent may be obtained for five cents each, by addressing the "Commissioner of Patents, Washington, D. C."